(12) United States Patent
Li et al.

(10) Patent No.: US 11,997,509 B2
(45) Date of Patent: May 28, 2024

(54) METHODS FOR PATHLOSS REFERENCE SIGNAL ACTIVATION

(71) Applicant: Apple Inc., Cupertino, CA (US)

(72) Inventors: Qiming Li, Beijing (CN); Manasa Raghavan, Cupertino, CA (US); Dawei Zhang, Cupertino, CA (US); Huaning Niu, Cupertino, CA (US); Jie Cui, Cupertino, CA (US); Panagiotis Botsinis, Munich (DE); Sameh M. Eldessoki, Munich (DE); Xiang Chen, Cupertino, CA (US); Yang Tang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/442,983

(22) PCT Filed: Jan. 14, 2021

(86) PCT No.: PCT/CN2021/071886
§ 371 (c)(1),
(2) Date: Sep. 24, 2021

(87) PCT Pub. No.: WO2022/151235
PCT Pub. Date: Jul. 21, 2022

(65) Prior Publication Data
US 2023/0362664 A1    Nov. 9, 2023

(51) Int. Cl.
*H04B 17/318* (2015.01)
*H04L 5/00* (2006.01)
*H04W 16/28* (2009.01)

(52) U.S. Cl.
CPC .......... *H04W 16/28* (2013.01); *H04B 17/328* (2023.05); *H04L 5/0051* (2013.01)

(58) Field of Classification Search
CPC ... H04W 16/28; H04B 17/328; H04B 7/0695; H04L 5/0051
See application file for complete search history.

(56) References Cited

U.S. PATENT DOCUMENTS

2019/0081675 A1* 3/2019 Jung .................... H04B 7/0695
2020/0389849 A1* 12/2020 Ryu .................... H04W 52/146
(Continued)

OTHER PUBLICATIONS

Extended European Search Report received in related European Application No. 21918443.9, mailed Feb. 15, 2024, 14 pages.
(Continued)

*Primary Examiner* — Ayaz R Sheikh
*Assistant Examiner* — Mang Boi Thawng
(74) *Attorney, Agent, or Firm* — Womble Bond Dickinson (US) LLP

(57) ABSTRACT

Methods and systems to activate beams for beam switching based on measurements of a downlink reference signal that is QCL Type-D with a downlink pathloss reference signal are disclosed. A UE may measure and report to a base station the RSRP of the reference signal that is QCL Type-D with a target downlink pathloss reference signal. Based on the reported RSRP measurements, the base station may activate the target pathloss reference signal to command the UE to update the pathloss measurements of the target pathloss reference signal for uplink power control of a beam corresponding to the target pathloss reference signal. The UE may determine whether the target pathloss reference signal is considered known for uplink power control based on the timing relationship among the reception of the reference signal from the base station, the transmission of the RSRP measurement of the reference signal, and reception of the activation command.

20 Claims, 12 Drawing Sheets

(56) References Cited

U.S. PATENT DOCUMENTS

2021/0410160 A1\* 12/2021 Guo ................. H04B 7/0632
2022/0345907 A1\* 10/2022 Yu .................. H04B 7/0617

OTHER PUBLICATIONS

NTT Docomo, Inc. "Remaining Issues on Multi-Beam Operation" 3GPP TSG RAN WG1 #100-e R1-2000926, Feb. 24, 2020, 10 pages.
Nokia. "Enhancements on Multi-beam Operation" 3GPP TSG RAN WG1 #97 R1-1907317, May 13, 2019, 20 pages.

\* cited by examiner

METHODS FOR PATHLOSS REFERENCE SIGNAL ACTIVATION

RELATED APPLICATIONS

The present application is the national phase of International Application No. PCT/CN2021/071886, filed on Jan. 14, 2021 and the disclosure of which is hereby incorporated herein by reference in its entirety.

FIELD OF INVENTION

This invention relates generally to the field of wireless communication, and more particularly, to systems and methods for wireless communication devices to use pathloss reference signals carried on radio beams received from base stations to update or switch beams used for transmitting to the base stations. Other aspects are also described.

BACKGROUND OF THE INVENTION

In wireless communications networks, a user equipment (UE) may communicate with a base station of the networks by switching among multiple radio beams. The UE may implement beam management to identify and maintain optimal beams for transmissions to and receptions from the base station as the channel characteristics change due to fluctuating environmental conditions, user mobility, etc. For example, beamforming on the base station, UE, or both may use multiple antenna elements to generate multiple beams with varying gains and directionalities. Each beam may be characterized by pathloss, Doppler shift, delay, or other properties of the channel through which the beam propagates.

To implement beam switching at the UE, the UE may measure, maintain, and update characteristics of the beams so the desired transmit or receive beams may be selected. For example, the base station may transmit beams carrying reference signals in the downlink direction for the UE to measure the received power of the reference signals to identify the beam with the minimum pathloss. The UE may report the measured reference signal received power (RSRP) of the beams to the base station for the base station to select one or more beams for downlink transmissions to the UE. The UE may also maintain or update the measured RSRP of the downlink beams. The UE may use the measured RSRP of a downlink beam to determine the pathloss of the downlink beam and to determine the transmit power for uplink transmissions to the base station using an uplink beam corresponding to the downlink beams.

Because channel conditions may change rapidly, the RSRP measurement may not reflect the pathloss of the current channel if the channel conditions have changed significantly since the last measurement. When the decision on beam switching is made based on out-of-date RSRP measurements, the UE may not switch to the beam with the least pathloss. In another scenario, the UE may need to incur additional delays to update the pathloss of the reference signals, delaying the switch to the appropriate beam and potentially reducing data throughput. Thus, there is a need for an enhanced mechanism for the UE to measure, update, and maintain characteristics of the beams to select the appropriate beam.

SUMMARY OF THE DESCRIPTION

Methods and systems to activate beams for beam switching based on measurements of downlink pathloss reference signals or other downlink reference signals that share spatial receiver parameters with the downlink pathloss reference signals are disclosed. Pathloss reference signals may share spatial receiver parameters with another reference signals when transmissions of the two reference signals experience radio channels that share common characteristics. The two reference signals sharing common radio channel characteristics may be referred to as being quasi co-located (QCL or QCLed) when the reference signals are transmitted from different antenna ports. Different types of the QCL relationship indicate sharing of different channel characteristics between the beams carrying the two reference signals from the antenna ports. For example, QCL Type-D indicates that the two reference signals share spatial receiver parameters such as pathloss, angles of arrival, etc. A UE may measure the received power of the reference signals that are QCL Type-D with the pathloss reference signals to determine if the channel conditions of the pathloss reference signals have changed even if the received power of the pathloss reference signals has not been measured recently. When the base station activates the beam carrying the pathloss reference signals for uplink transmission, the UE may rapidly switch to the beam by determining the uplink transmit power because the pathloss reference signals is considered known based on the measured received power of the reference signal.

The base station may configure the UE to monitor a number of downlink pathloss reference signals for reporting of channel state information. For example, the base station may configure the UE downlink pathloss reference signals to measure and report the reference signal received power (RSRP) of the downlink pathloss reference signals. In one aspect, the number of downlink pathloss reference signals whose RSRP is measured may be configured to be 64. Based on the reported RSRP of the configured pathloss reference signals, the base station may issue activation commands to the UE to maintain or update the pathloss measurements of a subset of the pathloss reference signals whose reported RSRP are the strongest for purpose of uplink power control. The number of pathloss reference signals activated for uplink power control may be a small subset of the total number of configured pathloss reference signals, for example 4 out of 64. The base station may select a beam corresponding to one of these activated pathloss reference signals for uplink transmission from the UE to the base station.

To prepare for uplink transmission, the UE may quickly determine the transmit power corresponding to a pathloss reference signal that has been activated for uplink power control based on the latest RSRP measurement. If the latest RSRP measurement is based strictly on the RSRP measurement of the activated pathloss reference signal, it may not reflect the latest channel condition. In one aspect, by also considering the RSRP measurement of a reference signal that is QCL Type-D with the activated pathloss reference signal, the uplink power control may leverage more resources, enabling a faster determination of the uplink transmit power after the pathloss reference signal is activated.

In one aspect, a method for beam management by a UE with a base station of a communication network is disclosed. The UE may receive from the base station a reference signal of a radio channel between the UE and the base station. The reference signal is QCL with a target reference signal of the radio channel. The UE may determine the received signal power of the reference signal and may transmit to the base station a RSRP measurement based on the received signal power of the reference signal. The UE may receive from the base station a command to activate the target reference signal. The UE may determine whether the target reference signal is known for beam management of the radio channel based on the timing when the reference signal is received from the base station, when the RSRP measurement of the reference signal is transmitted to the base station, and when the command is received from the base station to activate the target reference signal. When the target reference signal is determined to be known, the UE may determine characteristics of a beam of the radio channel to switch to the beam within a maximum delay after the command is received from the base station.

In one aspect, a method for beam management by a base station with a UE of a communication network is disclose. The base station may transmit to the UE a reference signal of a radio channel. The reference signal is QCL with a target reference signal of the radio channel. The base station may receive from the UE a RSRP measurement of the reference signal. Based on the RSRP measurement, the base station may transmit to the UE a command to activate the target reference signal for communicating with the base station. The command enables the UE to determine whether the target reference signal is considered known for beam management of the radio channel.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
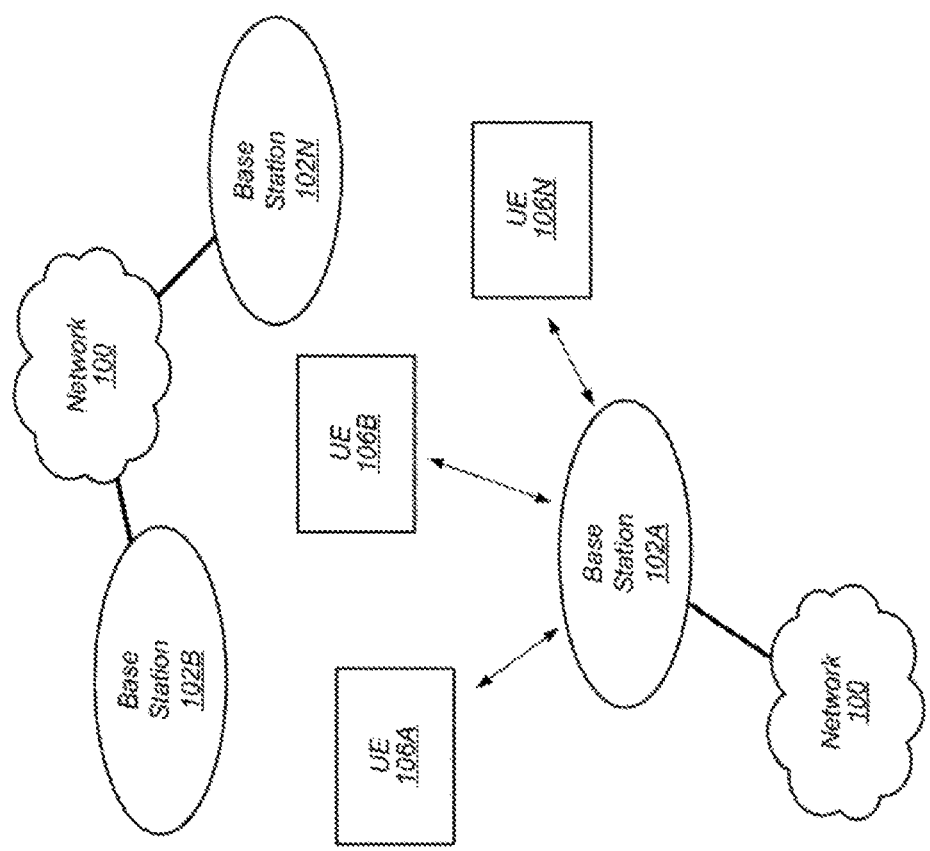
FIG. 1 illustrates an example wireless communication system according to one aspect of the disclosure.

Methods and systems to activate beams for beam switching based on measurements of downlink pathloss reference signals or other downlink reference signals that are QCL Type-D with the downlink pathloss reference signals are disclosed. A UE may measure and report to a base station the RSRP of either a reference signal that is QCL Type-D with a target pathloss reference signal or the RSRP of the target pathloss reference signal carried in one or more beams received from the base station. Based on the reported RSRP measurements received from the UE, the base station may activate the target pathloss reference signal to command the UE to maintain or update the pathloss measurements of the target pathloss reference signal for uplink power control of a beam corresponding to the target pathloss reference signal. The UE may determine whether the target pathloss reference signal is considered known for uplink power control based on the timing relationship among the reception of either the reference signal or the target pathloss reference signal from the base station, the transmission of the RSRP measurement of either the reference signal or the target pathloss reference signal, and the activation of the target pathloss reference signal.

In one aspect, the target pathloss reference signal may be considered known when the reference signal that is QCL Type-D with the target pathloss reference signal was last received for beam measurement and reporting within a pre-set time interval prior to the activation of the target pathloss reference signal and the RSRP measurement of the reference signal was transmitted within the pre-set time interval. The target pathloss reference signal may be considered known even when the target pathloss reference signal was not received within the pre-set time interval or the RSRP measurement of the target pathloss reference signal was not transmitted within the pre-set time interval. When the target pathloss reference signal is determined to be known, the UE may maintain the pathloss measurement to update the estimated pathloss of the target pathloss reference signal. The UE may rapidly switch, within a maximum threshold interval after the activation of the target pathloss reference signal, to a beam corresponding to beam carrying the target pathloss reference signal for uplink transmission by determining the uplink transmit power based on the estimated pathloss.

In one aspect, the target pathloss reference signal may be considered unknown when neither the reference signal that is QCL Type-D with the target pathloss reference signal nor the target pathloss reference signal was last received for beam measurement and reporting within a pre-set time interval prior to the activation of the target pathloss reference signal. In one aspect, the target pathloss reference signal may be considered unknown when the reference signal or the target pathloss reference signal was last received within the pre-set time interval prior to the activation of the target pathloss reference signal, but the RSRP measurement of the reference signal received within the pre-set time interval or the RSRP measurement of the target pathloss reference signal received within the pre-set time interval was not transmitted within the pre-set time interval. When the target pathloss reference signal is determined to be unknown, the UE may need additional time to perform receive beam sweep to estimate the pathloss of the target pathloss reference signal. It may take longer for the UE to switch, after the activation of the target pathloss reference signal, to an uplink beam corresponding to the target pathloss reference signal based on the estimated pathloss compared to the switching time when the target pathloss reference signal is considered known.

In one aspect, the target pathloss reference signal may include the synchronization signal/physical broadcast channel (SS/PBCH or SSB) block transmitted by the base station on broad beams used by the UE for initial beam management or the channel state information reference signal (CSI-RS) transmitted on more directional beams used by the UE to refine the beam selection. In one aspect, the reference signal that is QCL Type-D with the target pathloss reference signal may include other CSI-RS resources or SSB in the QCL chain of the target pathloss reference signal used by the UE for characterizing downlink beams from the base station. In one aspect, the activation of the target pathloss reference signal may be commanded by the base station via a medium access control control element (MAC-CE). In one aspect, the QCL Type-D relationship between the reference signal and the target pathloss reference signal in the QCL chain may be configured by the base station using transmission configuration indicator (TCI) states via radio resource control (RRC) signaling. The base station may also configure the UE to measure and report the RSRP of the reference signal or the target pathloss reference signal.

In one aspect, the UE may determine the best receive beams by measuring the RSRP of the target pathloss reference signals or the RSRP of reference signals that are QCL Type-D with the target pathloss reference signals (e.g., resources configured as Type-D in the QCL chains of the target pathloss reference signals) carried by receive beams. The RSRP measurements may be transmitted to the base station for the base station to select one or more receive beams for downlink transmissions or to select beams that correspond to the receive beams for uplink transmissions.

The base station may activate the selected beams for uplink power control by commanding the UE to maintain or update the pathloss of the target pathloss reference signals. The disclosed methods and systems expand the definition of when a target pathloss reference signal is considered known when a selected beam is activated to include the RSRP measurements of the reference signal that is QCL Type-D with the target pathloss reference signal. Advantageously, by considering not just the target pathloss reference signal but also the reference signal that is QCL Type-D with the target pathloss reference signal, the UE may rapidly switch to a beam corresponding to the target pathloss reference signal for uplink transmission.

In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "some embodiments" or "an embodiment" means that a particular feature, structure, or characteristic described in connection with the embodiment can be included in at least one embodiment of the invention. The appearances of the phrase "in some embodiments" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

FIG. 1 illustrates a simplified example wireless communication system according to one aspect of the disclosure. It is noted that the system of FIG. 1 is merely one example of a possible system, and that features of this disclosure may be implemented in any of various systems, as desired.

As shown, the example wireless communication system includes a base station 102A which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an eNodeB' or 'eNB'. Note that if the base station 102A is implemented in the context of 5G NR, it may alternately be referred to as gNodeB' or gNB'.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Figure 2:
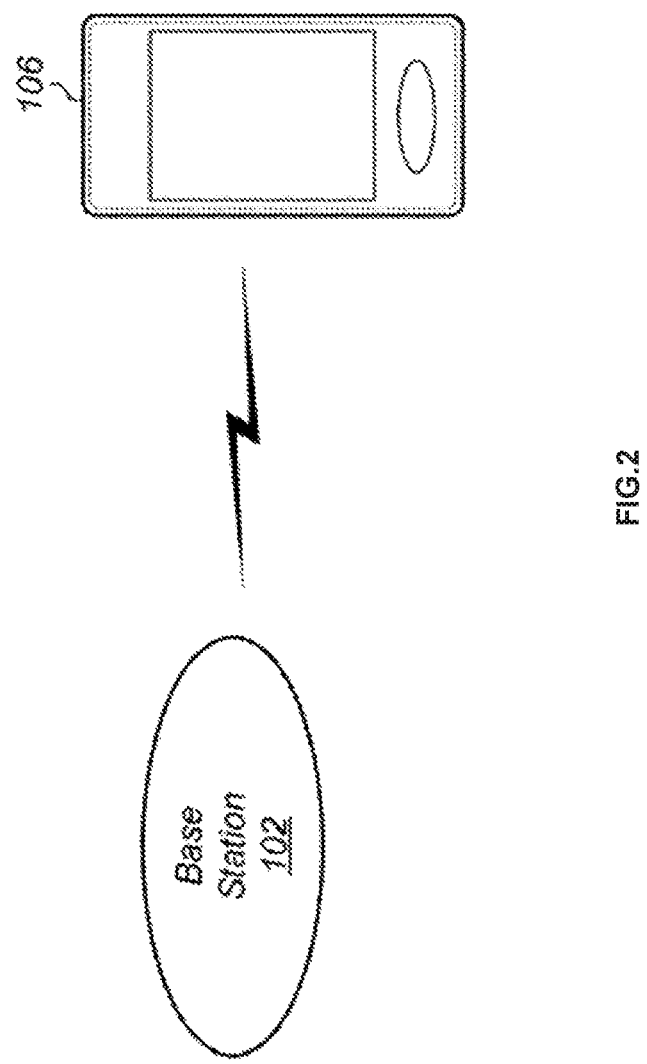
FIG. 2 illustrates user equipment in direct communication with a base station (BS) according to one aspect of the disclosure.

FIG. 2 illustrates a UE 106 in direct communication with a base station 102 through uplink and downlink communications according to one aspect of the disclosure. The UE 106 may be a device with cellular communication capability such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
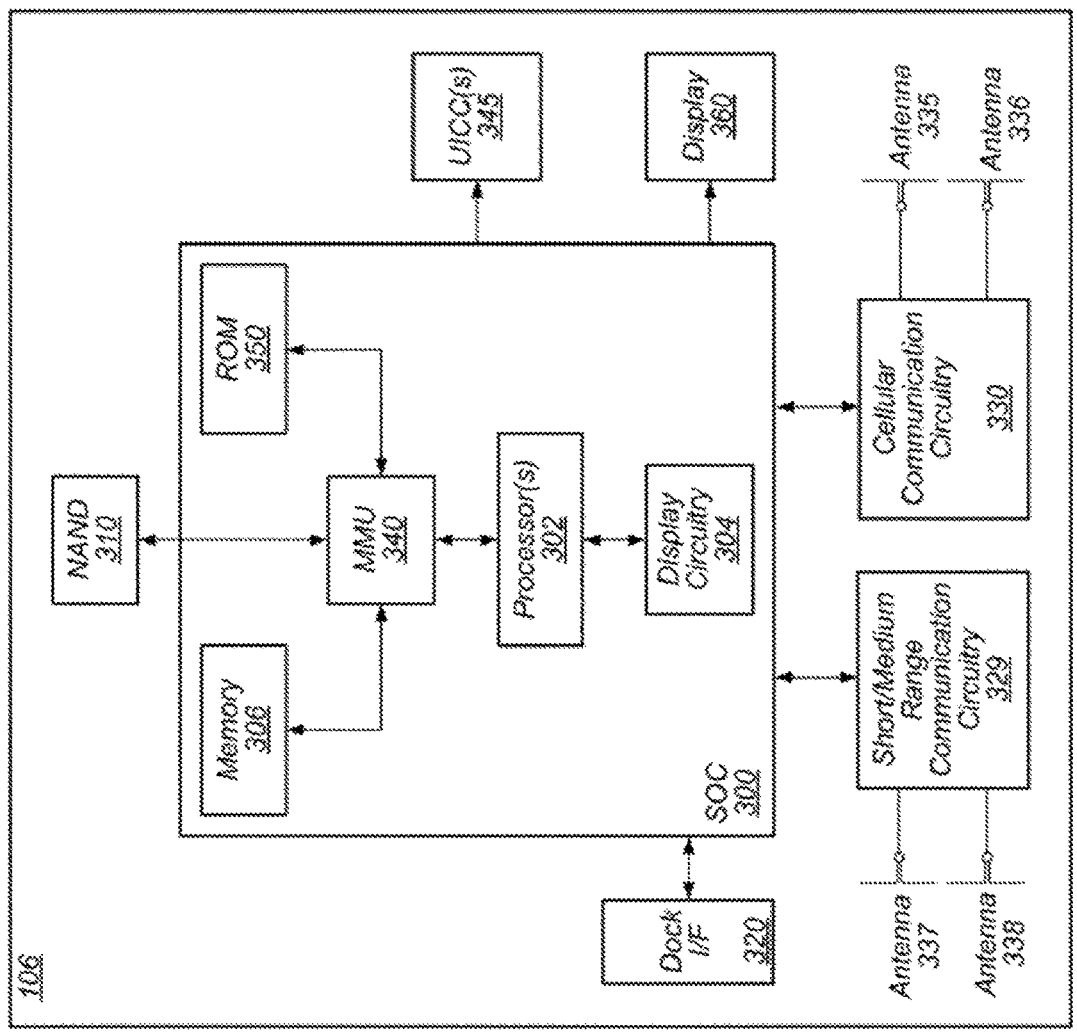
FIG. 3 illustrates an example block diagram of a UE according to one aspect of the disclosure.

FIG. 3 illustrates an example simplified block diagram of a communication device 106 according to one aspect of the disclosure. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple radio access technologies (RATs) (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may also be configured to determine a physical downlink shared channel scheduling resource for a user equipment device and a base station. Further, the communication device 106 may be configured to group and select CCs from the wireless link and determine a virtual CC from the group of selected CCs. The wireless device may also be configured to perform a physical downlink resource mapping based on an aggregate resource matching patterns of groups of CCs.

As described herein, the communication device 106 may include hardware and software components for implementing the above features for determining a physical downlink shared channel scheduling resource for a communications device 106 and a base station. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition), the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
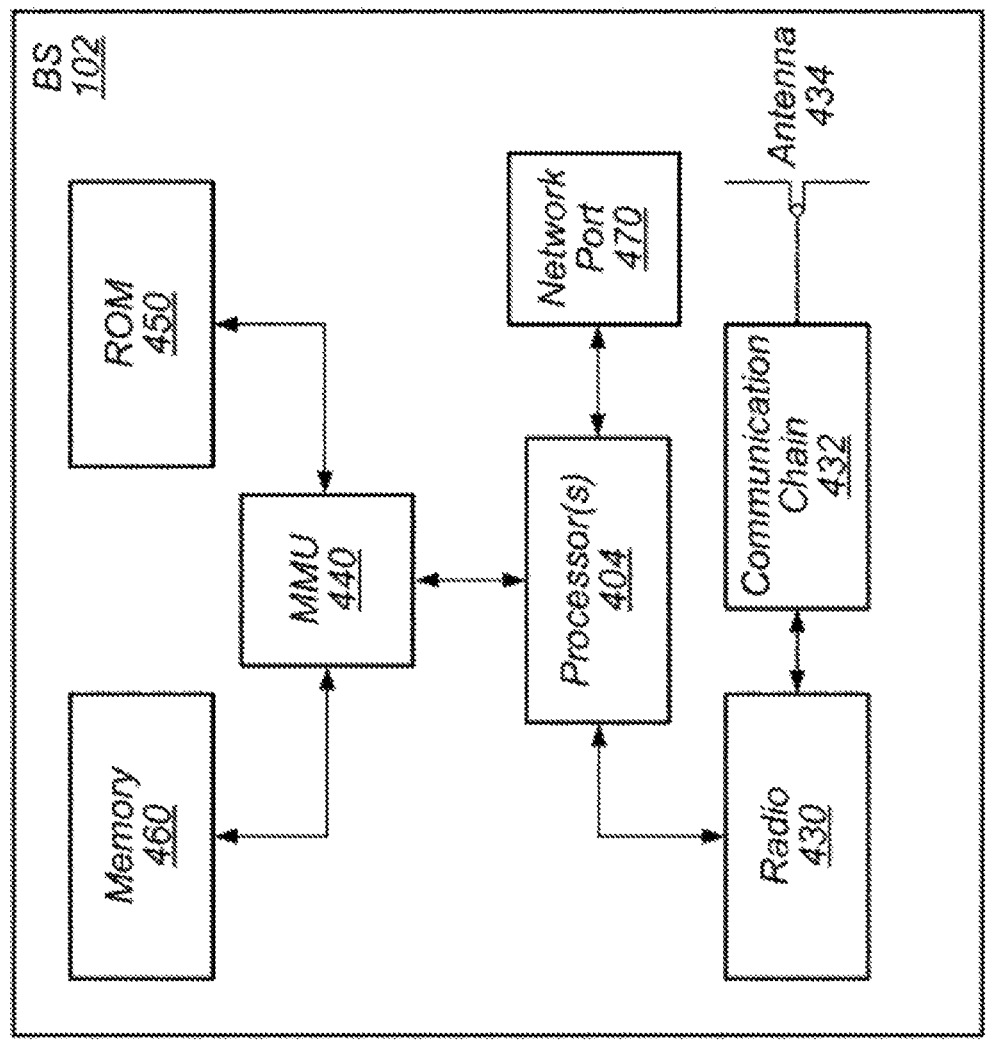
FIG. 4 illustrates an example block diagram of a BS according to one aspect of the disclosure.

FIG. 4 illustrates an example block diagram of a base station 102 according to one aspect of the disclosure. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UEs 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UEs 106. In some cases, the network port 470 may couple to a telephone network via the core network, and/or the core network may provide a telephone network (e.g., among other UEs serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UEs 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition), the processor 404 of the BS 102, in conjunction with one or more of the other components 430, 432, 434, 440, 450, 460, 470 may be configured to implement or support implementation of part or all of the features described herein.

In addition, as described herein, processor(s) 404 may be comprised of one or more processing elements. In other words, one or more processing elements may be included in processor(s) 404. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may be comprised of one or more processing elements. In other words, one or more processing elements may be included in radio 430. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
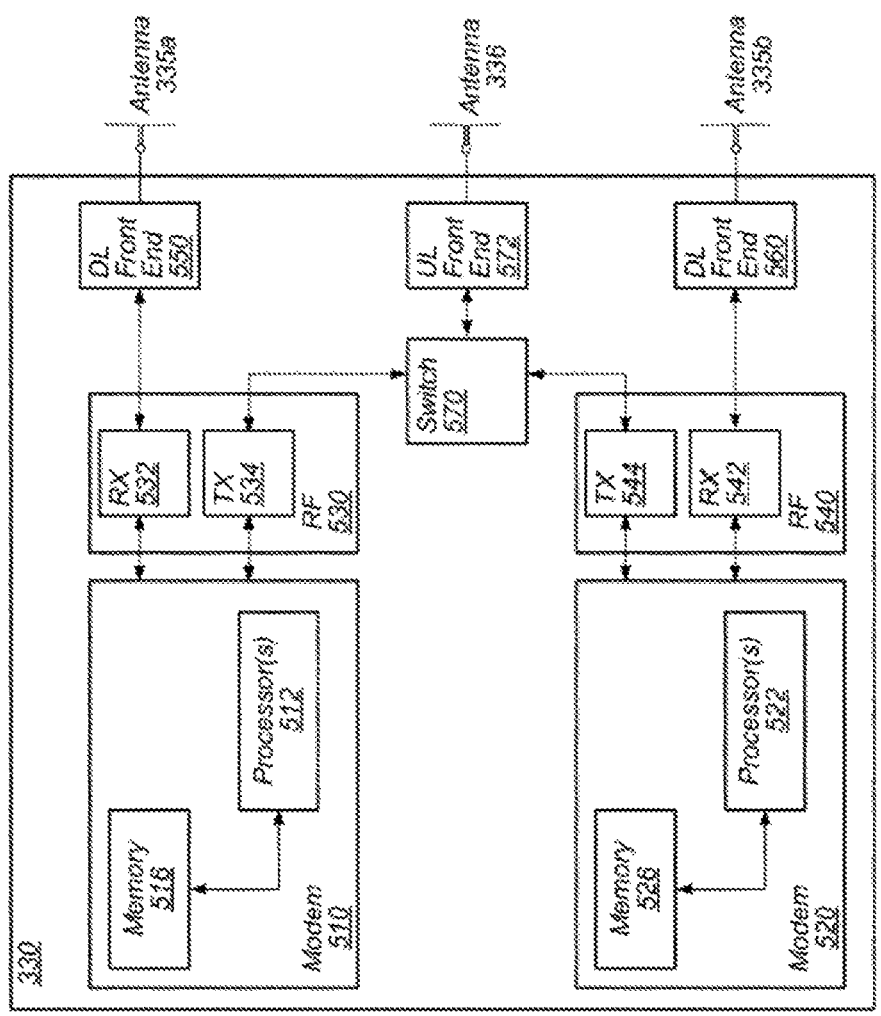
FIG. 5 illustrates an example block diagram of cellular communication circuitry according to one aspect of the disclosure.

FIG. 5 illustrates an example simplified block diagram of cellular communication circuitry according to one aspect of the disclosure. It is noted that the block diagram of the cellular communication circuitry of FIG. 5 is only one example of a possible cellular communication circuit. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335 a-b and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

As described herein, the modem 510 may include hardware and software components for implementing the above features or for selecting a periodic resource part for a user equipment device and a base station, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition), the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing the above features for selecting a periodic resource on a wireless link between a UE and a base station, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition), the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6:
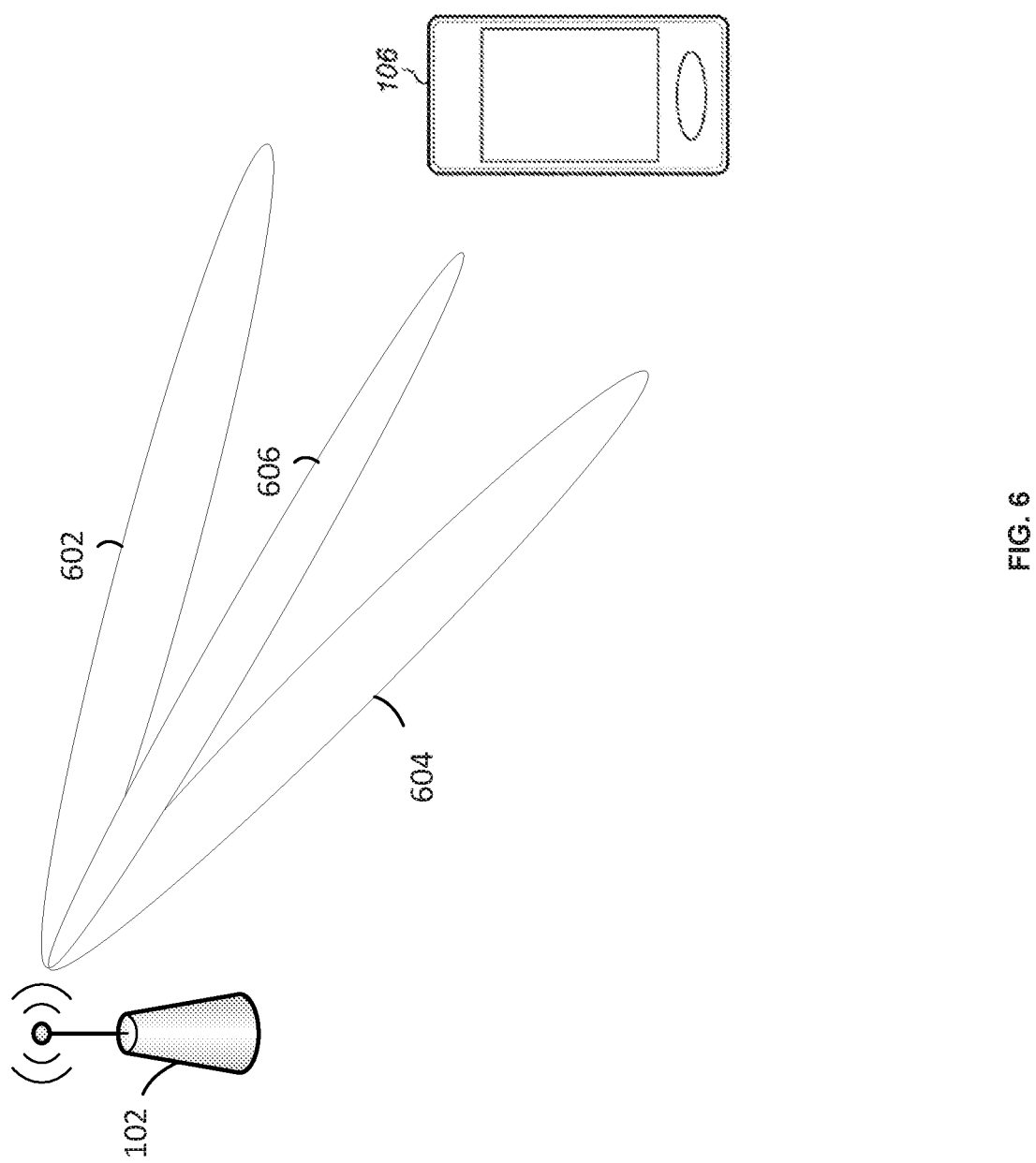
FIG. 6 depicts a BS transmitting multiple beams to a UE with some of the beams carrying pathloss reference signals for the UE to make RSRP measurements of the pathloss reference signals representing the channel condition experienced by the beams according to one aspect of the disclosure.

FIG. 6 depicts base station 102 transmitting multiple beams to UE 106 with some of the beams carrying pathloss reference signals for the UE 106 to make RSRP measurements of the pathloss reference signals representing the channel condition experienced by the beams according to one aspect of the disclosure. In one aspect, beamforming on the base station 102, UE 106, or both may use multiple antenna elements to generate beams 602, 604, and 606 with varying gains and directionalities. Each beam may be characterized by pathloss, Doppler shift, delay, or other properties of the radio channel through which the beam propagates.

In one aspect, beams 602 and 604 may carry pathloss reference signals and may be transmitted from the same antenna port for the UE 106 to perform beam sweep measurement to determine the channel properties. In one aspect, the pathloss reference signals in beams 602 or 604 may include the SS/PBCH block carried on broad beams used by the UE 106 to perform initial beam sweep to select a desirable beam. In one aspect, the pathloss reference signals in beams 602 or 604 may include the CSI-RS carried on more directional beams used by the UE to refine the beam selection.

In one aspect, beam 606 may be transmitted from a different antenna port to carry downlink control information (DCI) of the physical downlink control channel (PDCCH) or to carry downlink resources such as the physical downlink shared channel (PDSCH). In one aspect, beam 606 may also carry reference signals such as CSI-RS resources or SSB used by the UE to characterize beam 606.

In one aspect, the antenna ports for beams 602 and 606 may be QCL such that their radio channels share some common characteristics. If the common characteristics are spatial receiver parameters such as pathloss, angles of arrival, etc., the reference signals in beam 606 may be said to be QCL Type-D with the pathloss reference signal in beam 602. For example, the CSI-RS in beam 606 may be QCL Type-D with the CSI-RS or SSB in beam 602. The UE 106 may determine the RSRP for beam 606 using the CSI-RS or SSB and may apply the results for beam 602 because of the QCL Type-D relationship between the reference signals in beams 602 and 606. In one aspect, UE 106 may measure the RSRP of the reference signal in beam 606 to determine if the channel condition of beam 602 has changed even if the RSRP of the pathloss reference signal in beam 602 has not been measured recently. In one aspect, base station 102 may configure the QCL Type-D relationship between the reference signal in beam 606 and the pathloss reference signal in beam 602 using transmission configuration indicator (TCI) states via radio resource control (RRC) signaling.

Figure 7:
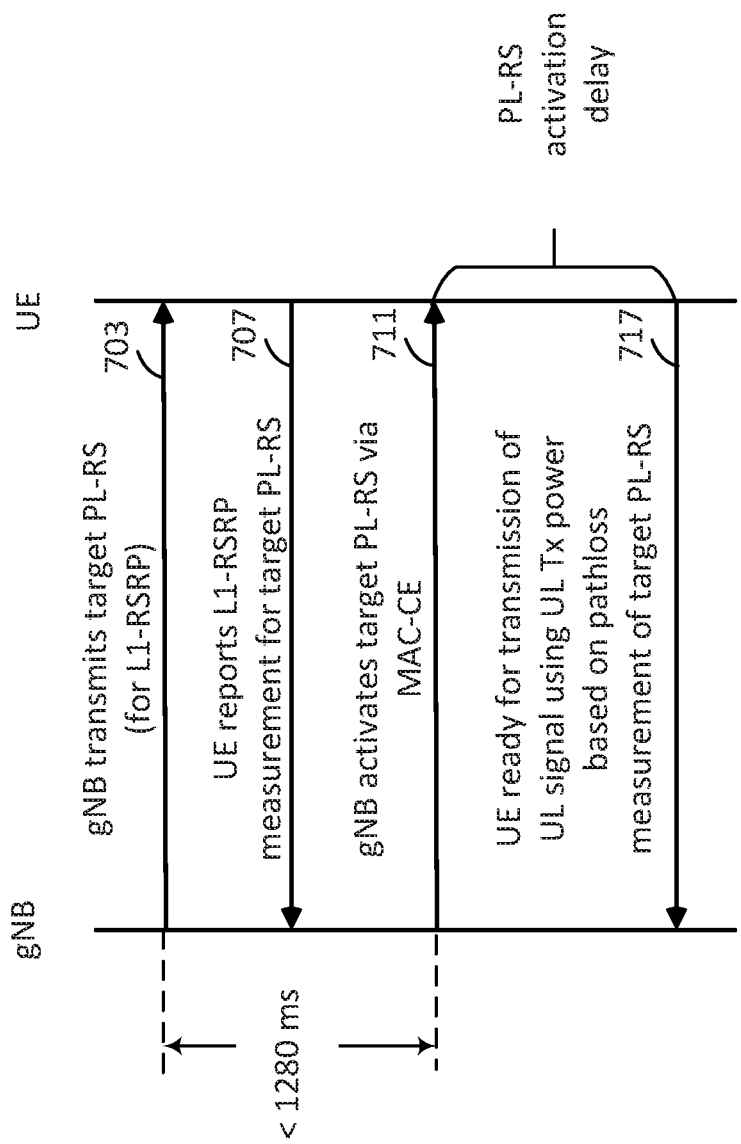
FIG. 7 depicts a call flow diagram between a BS and a UE for the UE to report the RSRP measurement of a target pathloss reference signal, for the BS to activate the target pathloss reference signal for uplink power control, and for the UE to estimate the pathloss of the target pathloss reference signal for uplink power control based on whether the target pathloss reference signal is known by considering the reporting of only the RSRP measurement of the target pathloss reference signal.

FIG. 7 depicts a call flow diagram between a BS (e.g., gNB) and a UE for the UE to report the RSRP measurement of a target pathloss reference signal, for the BS to activate the target pathloss reference signal for uplink power control, and for the UE to estimate the pathloss of the target pathloss reference signal for uplink power control based on whether the target pathloss reference signal is known by considering the reporting of only the RSRP measurement of the target pathloss reference signal. The gNB may be the base station 102 and the UE may be the UE 106 of FIG. 6. The target pathloss reference signal may be the SS/PBCH block or the CSI-RS carried on beam 602.

At operation 703, the gNB may transmit the target pathloss reference signal to the UE. In one aspect, the gNB may transmit the target pathloss reference signal periodically to all UEs in a serving area. The UE may perform physical layer RSRP (L1-RSRP) measurement of the target pathloss reference signal. In one aspect, the gNB may configure the UE to measure and report the RSRP of a number of pathloss reference signals, such as 64, carried on a number of beams of different directionalities for the UE to perform receive beam sweep.

At operation 707, the UE may report the L1-RSRP measurement of the target pathloss reference signal to the gNB. In one aspect, the UE may periodically or non-periodically report the L1-RSRP measurement made from one instance of the target pathloss reference signal or an average of the L1-RSRP measurements made from a number of repetitions of the target pathloss reference signals received. In one aspect, the UE may report the L1-RSRP measurements of a number of pathloss reference signals carried by different beams when configured to do so by the gNB.

Based on the L1-RSRP measurements reported by the UE for a number of pathloss reference signals, the gNB may select the beam carrying the target pathloss reference signal as a candidate beam for downlink or uplink transmission because of its stronger L1-RSRP measurement. At operation 711, the gNB may issue a switch command via MAC-CE to activate the UE to maintain or update the pathloss measurement of the target pathloss reference signal for uplink power control. The MAC-CE may identify the target pathloss reference signal as the one to update from the pathloss reference signals that were configured for L1-RSRP measurement reporting.

The UE may determine whether the target pathloss reference signal is considered known for uplink power control. In one aspect, the target pathloss reference signal may be considered known when the target pathloss reference signal was last received for beam measurement and reporting within a pre-set time interval prior to the reception of the switch command of operation 711, at least one RSRP measurement of the target pathloss reference signal was transmitted within the pre-set time interval, and the target pathloss reference signal and the associated synchronization signal block (SSB) remain detectable during a switching period following the reception of the switch command. In one aspect, the pre-set time interval is 1280 ms. In one aspect, the target pathloss reference signal and the associated SSB remain detectable during the switching period when the signal-to-noise ratio (SNR) of the target reference signal and the associated SSB are at or above −3 dB. When the target pathloss reference signal is determined to be known, the UE may update the estimated pathloss of the beam containing the target pathloss reference signal. In one aspect, the UE may estimate the pathloss of the beam containing the target pathloss reference signal by performing layer 3 RSRP measurement (L3-RSRP) of the target pathloss reference signal.

At operation 717, when the target pathloss reference signal is determined to be known, the UE may switch, within the switching period (e.g., target pathloss reference signal activation delay) after the reception of the switch command, to an uplink beam corresponding to the downlink beam carrying the target pathloss reference signal. The UE may switch to the uplink beam for uplink transmission by determining the uplink transmit power based on the estimated pathloss of the target pathloss reference signal within a maximum switching period.

If the target pathloss reference signal is determined to be unknown, the UE may need additional time to perform receive beam sweep to estimate the pathloss of the target pathloss reference signal. Thus, it may take longer for the UE to switch, after the reception of the switch command, to an uplink beam corresponding to the downlink beam carrying the target pathloss reference signal compared to the maximum switching period when the target pathloss reference signal is known. In one aspect, the uplink beam may be used to transmit PUCCH, PUSCH, or sounding reference signals (SRS).

Figure 8:
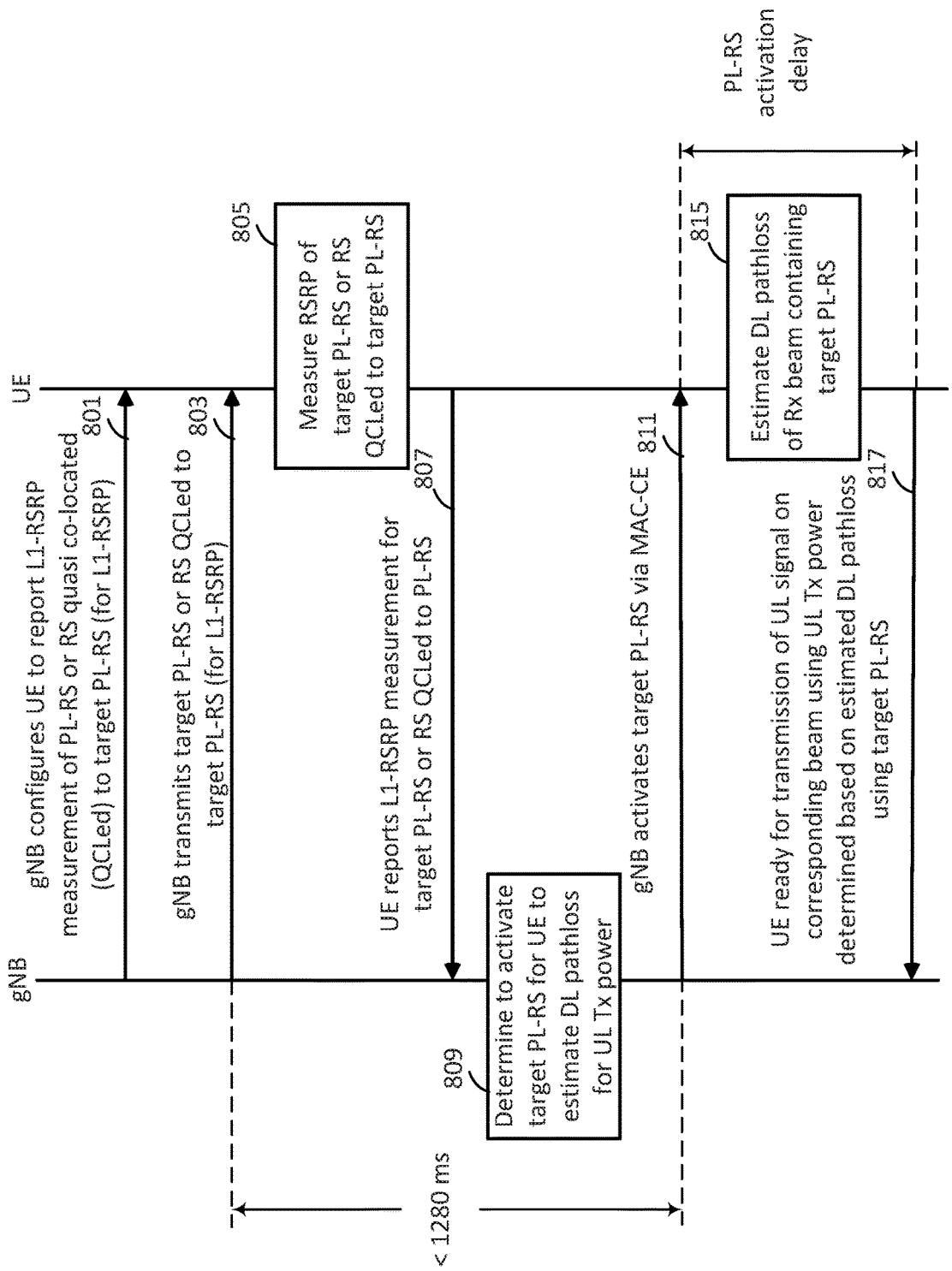
FIG. 8 depicts a call flow diagram between a BS and a UE for the UE to report RSRP measurement of a target pathloss reference signal or a reference signal QCL to the target pathloss reference signal, for the BS to activate the target pathloss reference signal for uplink power control, and for the UE to estimate the pathloss of the target pathloss reference signal for uplink power control based on whether the target pathloss reference signal is considered known by considering the reporting of the RSRP measurement of either the target pathloss reference signal or the reference signal according to one aspect of the disclosure.

FIG. 8 depicts a call flow diagram between a BS (e.g., gNB) and a UE for the UE to report RSRP measurement of a target pathloss reference signal or a reference signal QCL Type-D to the target pathloss reference signal, for the BS to activate the target pathloss reference signal for uplink power control, and for the UE to estimate the pathloss of the target pathloss reference signal for uplink power control based on whether the target pathloss reference signal is considered known by considering the reporting of the RSRP measurement of either the target pathloss reference signal or the reference signal according to one aspect of the disclosure. The gNB may be the base station 102 and the UE may be the UE 106 of FIG. 6. The target pathloss reference signal may be the SS/PBCH block or the CSI-RS carried on beam 602. The reference signal QCL Type-D to the target pathloss reference signal may be carried on beam 606.

At operation 801, the gNB may configure the UE to measure and report the RSRP of the target pathloss reference signal or the reference signal QCL Type-D to the target pathloss reference signal. In one aspect, the gNB may configure the UE to measure and report the RSRP of a number of pathloss reference signals or a number of reference signals QCL Type-D to the pathloss reference signals carried on a number of beams of different directionalities for the UE to perform receive beam sweep. In one aspect, the gNB may configure the QCL Type-D relationship between the reference signals and the pathloss reference signals in the QCL chain using TCI states via RRC signaling.

At operation 803, the gNB may transmit to the UE the target pathloss reference signal or the QCL Type-D reference signal. In one aspect, the gNB may transmit the target pathloss reference signal or the QCL Type-D reference signal periodically to all UEs in a serving area.

At operation 805, the UE may perform L1-RSRP measurement of the target pathloss reference signal or the QCL Type-D reference signal. In one aspect, the UE may perform an average of the L1-RSRP measurements made from a number of repetitions of the target pathloss reference signal or the QCL Type-D reference signal. In one aspect, the UE may perform L1-RSRP measurements of a number of pathloss reference signals or the QCL Type-D reference signals carried by different beams when configured to do so by the gNB.

At operation 807, the UE may report the L1-RSRP measurements of the target pathloss reference signal or the QCL Type-D reference signal to the gNB. In one aspect, the UE may periodically or non-periodically report the L1-RSRP measurements of a number of pathloss reference signals or the QCL Type-D reference signals carried by different beams.

At operation 809, based on the L1-RSRP measurements reported by the UE for a number of pathloss reference signals or the QCL Type-D reference signals, the gNB may select the beam carrying the target pathloss reference signal as a candidate beam for downlink or uplink transmission because of its stronger L1-RSRP measurement.

At operation 811, the gNB may issue a switch command via MAC-CE to activate the UE to maintain or update the pathloss measurement of the target pathloss reference signal for uplink power control. The MAC-CE may identify the target pathloss reference signal as the one to update from the pathloss reference signals that were configured for L1-RSRP measurement reporting.

At operation 815, the UE may determine whether the target pathloss reference signal is considered known for uplink power control. In one aspect, the target pathloss reference signal may be considered known when the target pathloss reference signal or the QCL Type-D reference signal was last received for beam measurement and reporting within a pre-set time interval prior to the reception of the switch command of operation 811, at least one RSRP measurement of the target pathloss reference signal or the QCL Type-D reference signal was transmitted within the pre-set time interval, and the target pathloss reference signal and the associated synchronization signal block (SSB) remain detectable during a switching period following the reception of the switch command. In one aspect, the pre-set time interval is 1280 ms. When the target pathloss reference signal is determined to be known, the UE may update the estimated pathloss of the beam containing the target pathloss reference signal. In one aspect, the UE may estimate the pathloss of the beam containing the target pathloss reference signal by performing layer 3 RSRP measurement (L3-RSRP) of the target pathloss reference signal.

Operation 815 expands the definition of when a target pathloss reference signal is considered known when a selected beam is activated for uplink power control to include the RSRP measurements of the reference signal that is QCL Type-D with the target pathloss reference signal carried by the selected beam. By considering not just the target pathloss reference signal but also the reference signal that is QCL Type-D with the target pathloss reference signal, the UE may rapidly switch to a beam corresponding to the target pathloss reference signal for uplink transmission.

At operation 817, when the target pathloss reference signal is determined to be known, the UE may switch, within the switching period (e.g., target pathloss reference signal activation delay) after the reception of the switch command, to an uplink beam corresponding to the downlink beam carrying the target pathloss reference signal. The UE may switch to the uplink beam for uplink transmission by determining the uplink transmit power based on the estimated pathloss of the target pathloss reference signal within a maximum switching period. Operation 817 may be similar to operation 717 of FIG. 7.

Figure 9:
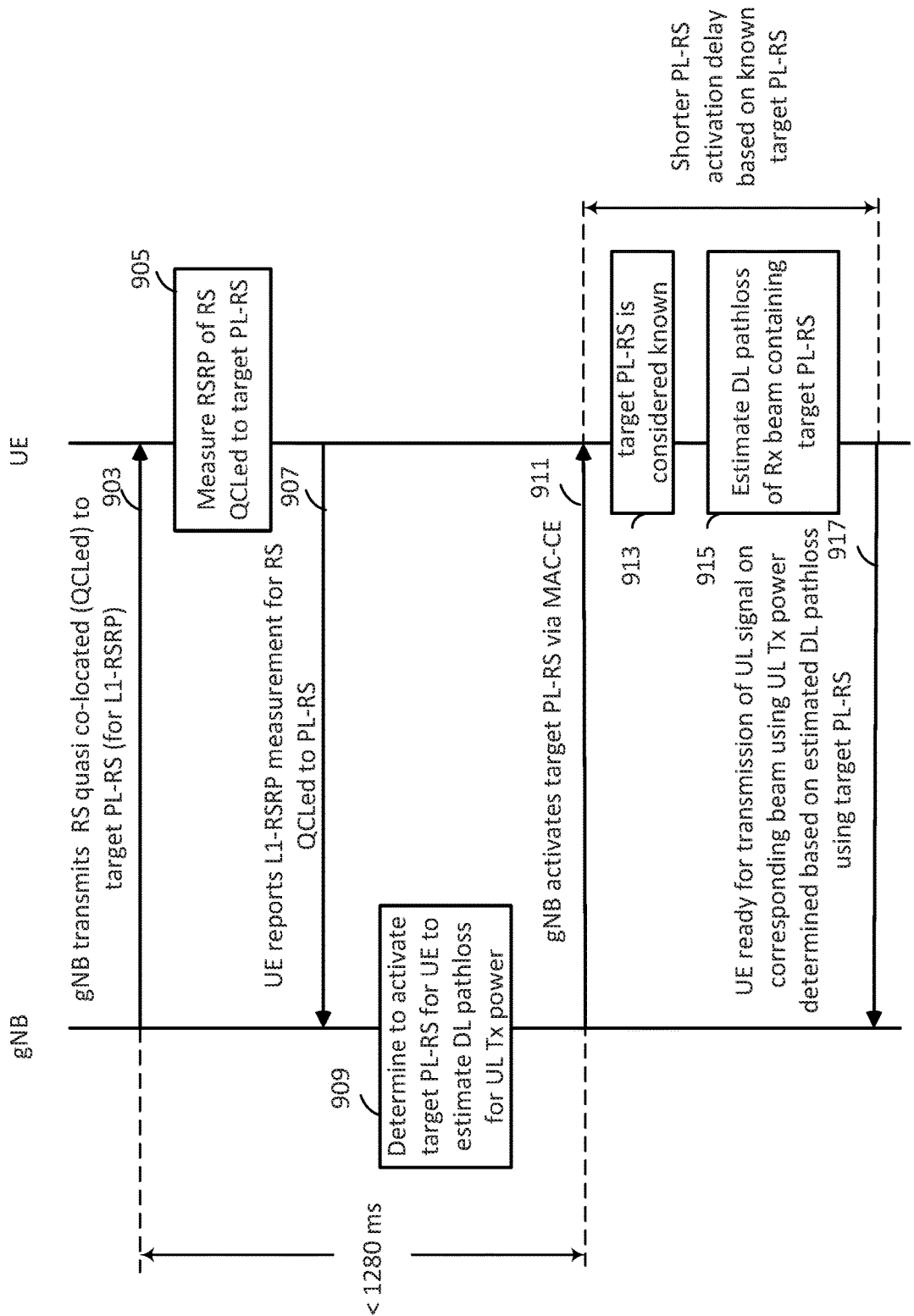
FIG. 9 depicts a call flow diagram between a BS and a UE for the UE to report RSRP measurement of a reference signal QCL to a target pathloss reference signal, for the BS to activate the target pathloss reference signal for uplink power control, and for the UE to estimate the pathloss of the target pathloss reference signal for uplink power control when the target pathloss reference signal is considered known based on the reporting of the RSRP measurement of the reference signal according to one aspect of the disclosure.

FIG. 9 depicts a call flow diagram between a BS (e.g., gNB) and a UE for the UE to report RSRP measurement of a reference signal QCL Type-D to a target pathloss reference signal, for the BS to activate the target pathloss reference signal for uplink power control, and for the UE to estimate the pathloss of the target pathloss reference signal for uplink power control when the target pathloss reference signal is considered known based on the reporting of the RSRP measurement of the reference signal according to one aspect of the disclosure.

At operation 903, the gNB may transmit to the UE the reference signal QCL Type-D to the target pathloss reference signal. In one aspect, the gNB may transmit the reference signal periodically.

At operation 905, the UE may perform L1-RSRP measurement of the reference signal QCL Type-D to the target pathloss reference signal. In one aspect, the UE may perform an average of the L1-RSRP measurements made from a number of repetitions of the reference signal. In one aspect, the UE may perform L1-RSRP measurements of a number of reference signals carried by different beams that are QCL Type-D to a number of pathloss reference signals.

At operation 907, the UE may report the L1-RSRP measurements of the reference signal to the gNB. In one aspect, the UE may periodically or non-periodically report the L1-RSRP measurements of a number of reference signals carried by different beams that are QCL Type-D to a number of pathloss reference signals.

At operation 909, based on the L1-RSRP measurements reported by the UE for a number reference signals, the gNB may select the beam carrying the target pathloss reference signal to which the reference signal transmitted in operation 903 is QCL Type-D as a candidate beam for downlink or uplink transmission because of the stronger L1-RSRP measurement of the reference signal.

At operation 911, the gNB may issue a switch command via MAC-CE to activate the UE to maintain or update the pathloss measurement of the target pathloss reference signal for uplink power control.

At operation 913, the UE may determine whether the target pathloss reference signal is considered known for uplink power control. In one aspect, the target pathloss reference signal may be considered known when the reference signal was last received for beam measurement and reporting within a pre-set time interval prior to the reception of the switch command of operation 911, at least one RSRP measurement of the reference signal was transmitted within the pre-set time interval, and the target pathloss reference signal and the associated synchronization signal block (SSB) remain detectable during a switching period following the reception of the switch command. In one aspect, the pre-set time interval is 1280 ms. As shown, the target pathloss reference signal may be considered known even when the target pathloss reference signal was not received within the pre-set time interval or the RSRP measurement of the target pathloss reference signal was not transmitted within the pre-set time interval.

At operation 915, when the target pathloss reference signal is determined to be known, the UE may update the estimated pathloss of the beam containing the target pathloss reference signal. In one aspect, the UE may estimate the pathloss of the beam containing the target pathloss reference signal by performing layer 3 RSRP measurement (L3-RSRP) of the target pathloss reference signal.

At operation 917, when the target pathloss reference signal is determined to be known, the UE may switch, within the switching period (e.g., target pathloss reference signal activation delay) after the reception of the switch command, to an uplink beam corresponding to the downlink beam carrying the target pathloss reference signal. The UE may switch to the uplink beam for uplink transmission by determining the uplink transmit power based on the estimated pathloss of the target pathloss reference signal within a maximum switching period. Operation 917 may be similar to operation 817 of FIG. 8 or operation 717 of FIG. 7.

Figure 10:
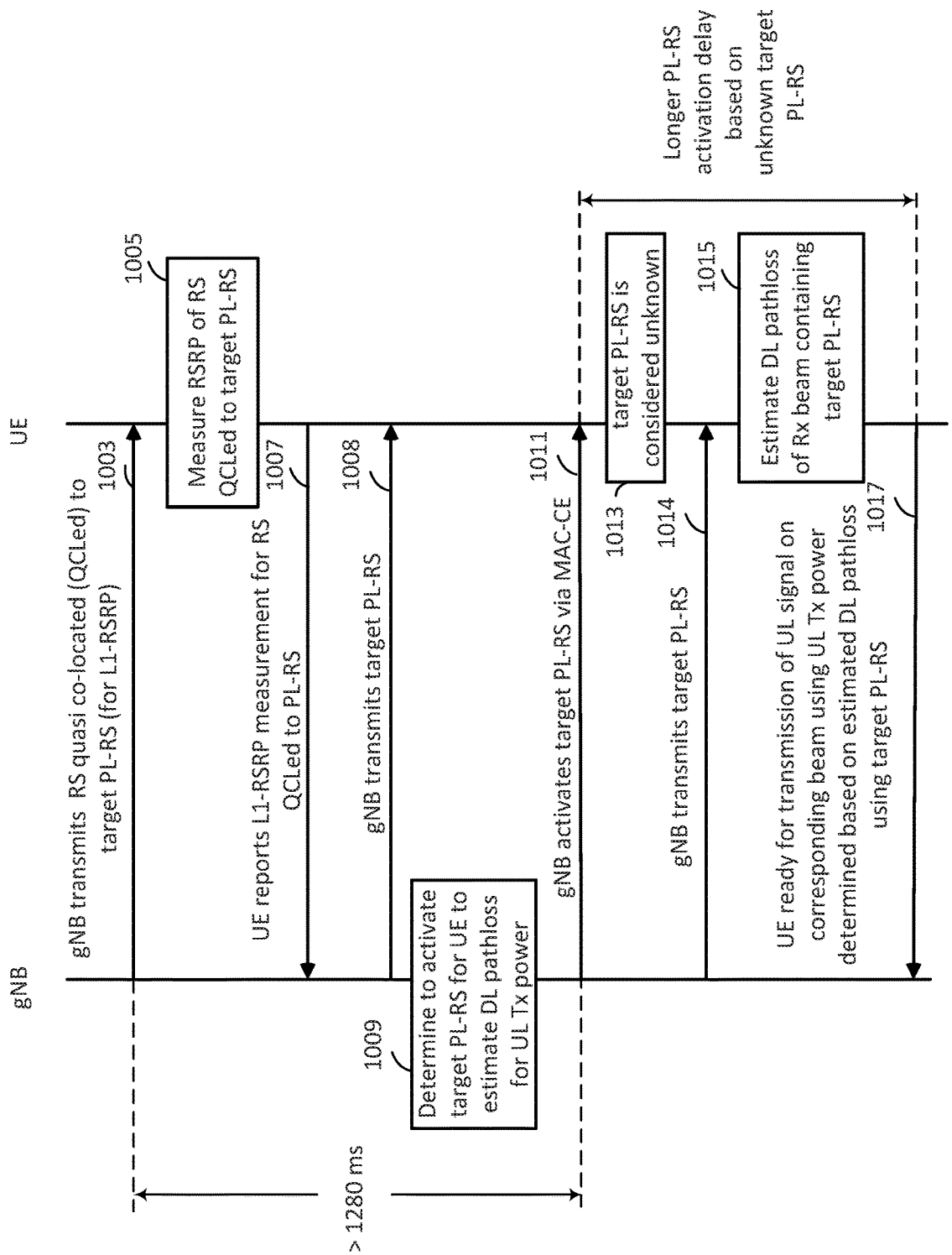
FIG. 10 depicts a call flow diagram between a BS and a UE for the UE to report RSRP measurement of a reference signal QCL to a target pathloss reference signal, for the BS to activate the target pathloss reference signal for uplink power control, and for the UE to estimate the pathloss of the target pathloss reference signal for uplink power control when the target pathloss reference signal is considered unknown based on the reporting of the RSRP measurement of the reference signal according to one aspect of the disclosure.

FIG. 10 depicts a call flow diagram between a BS (e.g., gNB) and a UE for the UE to report RSRP measurement of a reference signal QCL Type-D to a target pathloss reference signal, for the BS to activate the target pathloss reference signal for uplink power control, and for the UE to estimate the pathloss of the target pathloss reference signal for uplink power control when the target pathloss reference signal is considered unknown based on the reporting of the RSRP measurement of the reference signal according to one aspect of the disclosure.

At operation 1003, the gNB may transmit to the UE the reference signal QCL Type-D to the target pathloss reference signal. In one aspect, the gNB may transmit the reference signal periodically.

At operation 1005, the UE may perform L1-RSRP measurement of the reference signal QCL Type-D to the target pathloss reference signal. In one aspect, the UE may perform an average of the L1-RSRP measurements made from a number of repetitions of the reference signal. In one aspect, the UE may perform L1-RSRP measurements of a number of reference signals carried by different beams that are QCL Type-D to a number of pathloss reference signals.

At operation 1007, the UE may report the L1-RSRP measurements of the reference signal to the gNB. In one aspect, the UE may periodically or non-periodically report the L1-RSRP measurements of a number of reference signals carried by different beams that are QCL Type-D to a number of pathloss reference signals.

At operation 1008, the gNB may transmit to the UE the target pathloss reference signal to which the reference signal of operation 1003 is QCL Type-D. In one aspect, the gNB may transmit the target pathloss reference signal periodically to all UEs in a serving area.

At operation 1009, based on the L1-RSRP measurements reported by the UE for a number reference signals, the gNB may select the beam carrying the target pathloss reference signal to which the reference signal transmitted in operation 1003 is QCL Type-D as a candidate beam for downlink or uplink transmission because of the stronger L1-RSRP measurement of the reference signal.

At operation 1011, the gNB may issue a switch command via MAC-CE to activate the UE to maintain or update the pathloss measurement of the target pathloss reference signal for uplink power control.

At operation 1013, the UE may determine whether the target pathloss reference signal is considered known for uplink power control. In one aspect, the target pathloss reference signal may be considered unknown when neither the reference signal that is QCL Type-D with the target pathloss reference signal nor the target pathloss reference signal was last received for beam measurement and reporting within a pre-set time interval prior to the reception of the switch command of operation 1011. In one aspect, the target pathloss reference signal may be considered unknown when the reference signal or the target pathloss reference signal was last received within the pre-set time interval prior to the reception of the switch command, but the RSRP measurement of the reference signal received within the pre-set time interval or the RSRP measurement of the target pathloss reference signal received within the pre-set time interval was not transmitted within the pre-set time interval. In one aspect, the pre-set time interval is 1280 ms. As shown, the reference signal was not received for beam measurement and reporting within 1280 ms prior to the reception of the switch command. On the other hand, the target pathloss reference signal was last received within the 1280 ms prior to the reception of the switch command, but the RSRP measurement of the target pathloss reference signal was not transmitted within the 1280 ms. Thus, the target pathloss reference signal may be considered unknown.

At operation 1014, the gNB may transmit to the UE the target pathloss reference signal again.

At operation 1015, when the target pathloss reference signal is determined to be unknown, the UE may need additional time to perform receive beam sweep to estimate the pathloss of the target pathloss reference signal. In one aspect, the UE may estimate the pathloss of the beam containing the target pathloss reference signal by performing layer 3 RSRP measurement (L3-RSRP) of the target pathloss reference signal, such as the target pathloss reference signal received in operation 1014.

Thus, at operation 1017, when the target pathloss reference signal is determined to be unknown, it may take longer for the UE to switch, after the reception of the switch command, to an uplink beam corresponding to the downlink beam carrying the target pathloss reference signal based on the estimated pathloss compared to the switching time of FIG. 9 when the target pathloss reference signal is considered known.

Figure 11:
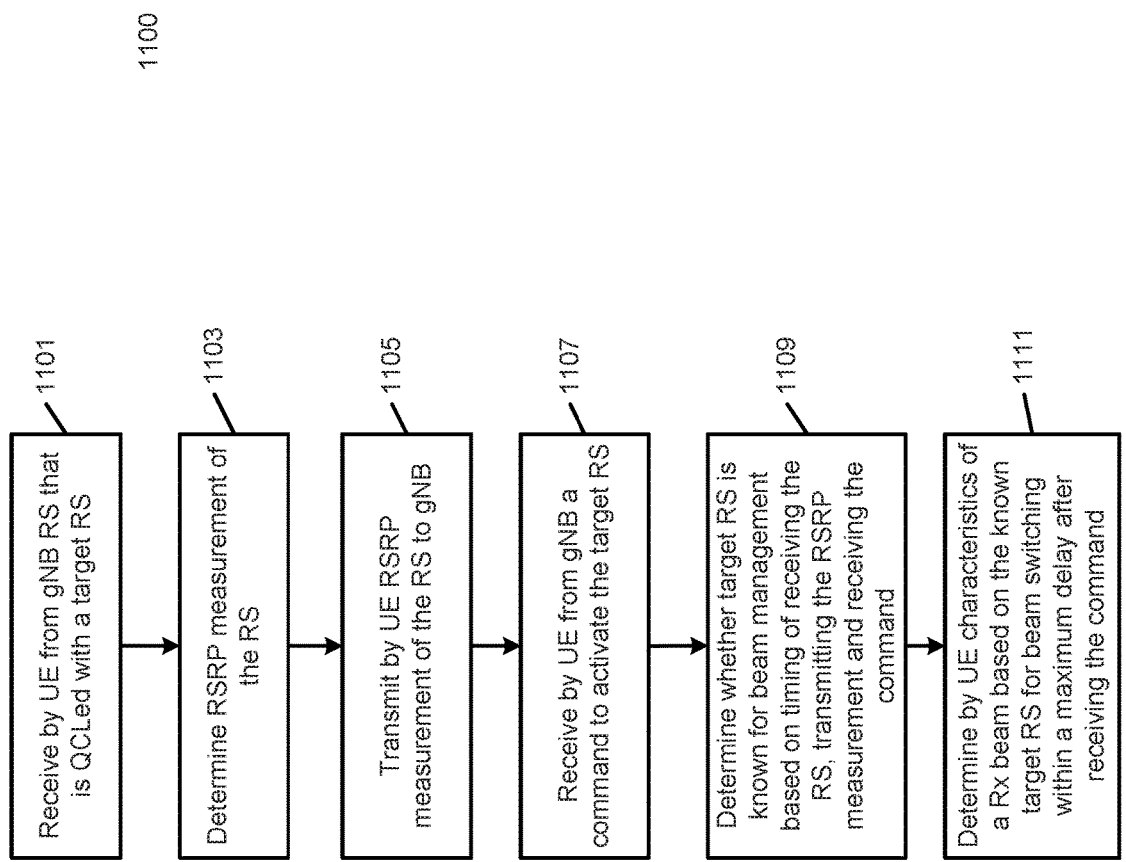
FIG. 11 is a flow diagram of a process for a UE to determine whether an activated target pathloss reference signal is considered known for uplink power control based on the reporting of the RSRP of a reference signal QCL to the activated target pathloss reference signal according to one aspect of the disclosure.

FIG. 11 is a flow diagram of a method 1100 for a UE to determine whether an activated target pathloss reference signal is considered known for uplink power control based on the reporting of the RSRP of a reference signal QCL to the activated target pathloss reference signal according to one aspect of the disclosure. The method 1100 may be practiced by the UE of FIG. 1, 2, 3, 6, 7, 8, 9, or 10.

In operation 1101, the UE receives from a gNB a reference signal that is QCL with a target pathloss reference signal. In one aspect, the reference signal is QCL Type-D with the target pathloss reference signal.

In operation 1103, the UE determines the RSRP measurement of the reference signal. In one aspect, the UE may perform L1-RSRP measurement of the reference signal.

In operation 1105, the UE transmits the RSRP measurement of the reference signal to the gNB.

In operation 1107, the UE receives from the gNB a switch command to activate the UE to maintain or update the pathloss measurement of the target pathloss reference signal for uplink power control. In one aspect, the UE may receive the switch command via MAC-CE.

In operation 1109, the UE determines whether the target pathloss reference signal is considered known for uplink power control based on the timing relationship among the reception of the reference signal in operation 1101, the transmission of the RSRP measurement of the reference signal in operation 1105, and the reception of the switch command in operation 1107. In one aspect, the target pathloss reference signal may be considered known when the reference signal was last received for beam measurement and reporting within a pre-set time interval prior to the reception of the switch command of operation, at least one RSRP measurement of the reference signal was transmitted within the pre-set time interval, and the target pathloss reference signal and the associated synchronization signal block (SSB) remain detectable during a switching period following the reception of the switch command. In one aspect, the pre-set time interval is 1280 ms. The target pathloss reference signal may be considered known even when the target pathloss reference signal was not received within the pre-set time interval or the RSRP measurement of the target pathloss reference signal was not transmitted within the pre-set time interval.

At operation 1111, when the target pathloss reference signal is determined to be known, the UE may determine the characteristics of the beam containing the target pathloss reference signal for uplink power control. In one aspect, the UE may update the estimated pathloss of the beam containing the target pathloss reference signal. In one aspect, the UE may switch, within a switching period after the reception of the switch command, to an uplink beam corresponding to the downlink beam carrying the target pathloss reference signal. The UE may switch to the uplink beam for uplink transmission by determining the uplink transmit power based on the estimated pathloss of the target pathloss reference signal within a maximum switching period.

Figure 12:
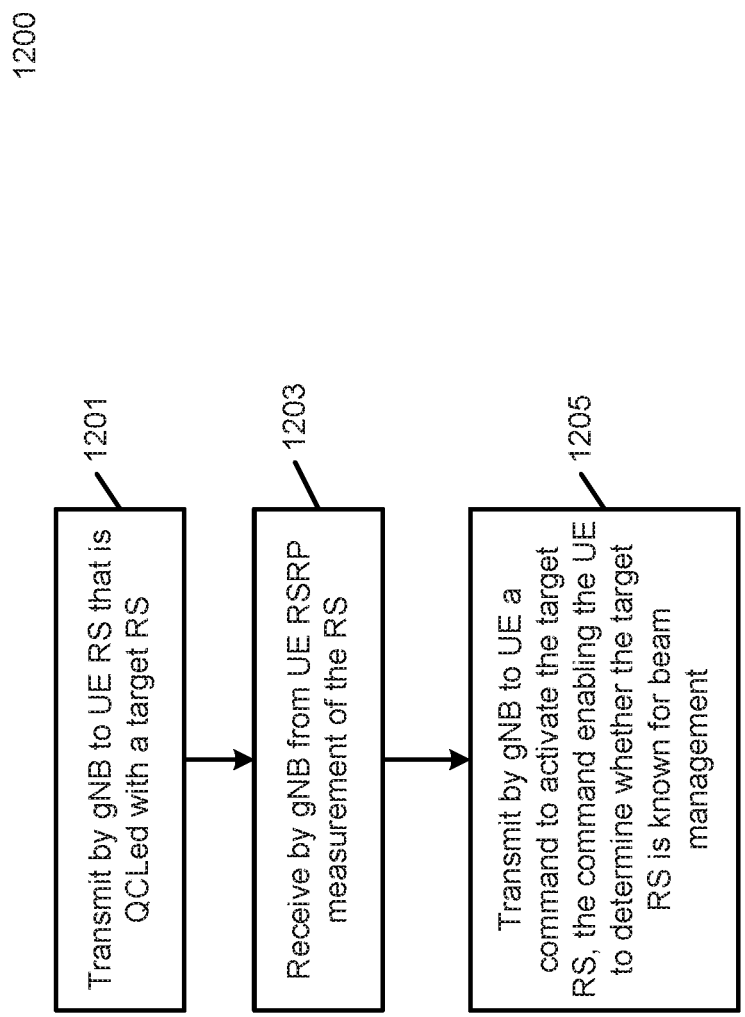
FIG. 12 is a flow diagram of a process for a base station to activate a target pathloss reference signal on a UE for uplink power control based on the reporting of the RSRP of a reference signal QCL to the activated pathloss reference signal according to one aspect of the disclosure.

FIG. 12 is a flow diagram of a process for a base station to activate a target pathloss reference signal on a UE for uplink power control based on the reporting of the RSRP of a reference signal QCL to the activated pathloss reference signal according to one aspect of the disclosure. The method 1100 may be practiced by the base station or gNB of FIG. 1, 2, 4, 6, 7, 8, 9, or 10.

At operation 1201, the gNB transmits to the UE a reference signal that is QCL with a target pathloss reference signal for beam measurement and reporting. In one aspect, the reference signal is QCL Type-D with the target pathloss reference signal.

At operation 1203, the gNB receives from the UE a RSRP measurement of the reference signal. The gNB may select the beam carrying the target pathloss reference signal to which the reference signal transmitted in operation 1201 is QCL Type-D as a candidate beam for downlink or uplink transmission At operation 1205, the gNB generates a switch command via MAC-CE to activate the UE to maintain or update the pathloss measurement of the target pathloss reference signal for uplink power control. The switch command may enable the UE to determine whether the target pathloss reference signal is considered known for uplink power control. In one aspect, the target pathloss reference signal may be considered known when the reference signal of operation 1201 was last received by the UE for beam measurement and reporting within a pre-set time interval prior to the reception of the switch command, at least one RSRP measurement of the reference signal was transmitted by the UE in operation 1203 within the pre-set time interval, and the target pathloss reference signal and the associated synchronization signal block (SSB) remain detectable by the UE during a switching period following the reception of the switch command. In one aspect, the pre-set time interval is 1280 ms.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "selecting," "determining," "receiving," "forming," "grouping," "aggregating," "generating," "removing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of beam management by a wireless user equipment (UE) with a base station in a communication network, the method comprising:
   receiving, by the UE from the base station, a reference signal of a radio channel between the UE and the base station, the reference signal being quasi co-located (QCL) with a target reference signal of the radio channel;
   determining, by the UE, a received signal power of the reference signal;
   transmitting, by the UE to the base station, a reference signal receiver power (RSRP) measurement based on the received signal power of the reference signal;
   receiving, by the UE from the base station, a command to activate the target reference signal;
   determining, by the UE, whether the target reference signal is known for beam management of the radio channel based on a timing of receiving the reference signal, transmitting the RSRP measurement, and receiving the command; and
   determining, by the UE, characteristics of a beam of the radio channel in response to the target reference signal is determined to be known for switching to the beam within a maximum delay after receiving the command.

2. The method of claim 1, wherein the reference signal is configured to be QCL with the target reference signal in a Type-D relationship, wherein the reference signal and the target reference signal share spatial receive parameters of the radio channel.

3. The method of claim 1, wherein determining whether the target reference signal is known for beam management of the radio channel comprises:
   determining that the reference signal that is QCL with the target reference signal was received within a maximum time interval prior to receiving the command;
   determining that the RSRP measurement was transmitted within the maximum time interval prior to receiving the command; and
   determining that the target reference signal is known for beam management of the radio channel.

4. The method of claim 3, wherein the target reference signal is determined to be known for beam management of the radio channel even if the target reference signal fails to be received within the maximum time interval prior to receiving the command.

5. The method of claim 3, wherein the reference signal comprises a plurality of reference signals in time, and wherein determining whether the target reference signal is known comprises determining that a last one of the plurality of reference signals was received within the maximum time interval prior to receiving the command.

6. The method of claim 1, wherein the reference signal comprises a synchronization signal block (SSB) or a channel state information reference signal (CSI-RS) used by the UE for characterizing beams of the radio channel from the base station to the UE.

7. The method of claim 1, wherein determining whether the target reference signal is known for beam management of the radio channel comprises:
   determining that the reference signal that is QCL with the target reference signal fails to be received within a maximum time interval prior to receiving the command; and
   determining that the target reference signal is unknown for beam management of the radio channel.

8. The method of claim 1, wherein determining whether the target reference signal is known for beam management of the radio channel comprises:
   determining that the reference signal that is QCL with the target reference signal was received within a maximum time interval prior to receiving the command;
   determining that the RSRP measurement fails to be transmitted within the maximum time interval prior to receiving the command; and
   determining that the target reference signal is unknown for beam management of the radio channel.

9. The method of claim 1, wherein the command is received through a medium access control control element (MAC-CE).

10. The method of claim 1, wherein determining characteristics of the beam of the radio channel in response to the target reference signal is determined to be known comprises:
    receiving, by the UE from the base station, the target reference signal;
    determining, by the UE, a pathloss of the beam of the radio channel based on the target reference signal; and
    determining, by the UE within the maximum delay from receiving the command based on the pathloss, a power for transmitting from the UE to the base station using the beam of the radio channel.

11. The method of claim 8, wherein in response to the target reference signal is determined to be the unknown for beam management of the radio channel, the method further comprises:
    receiving, by the UE from the base station, the target reference signal;
    determining, by the UE, a pathloss of the beam of the radio channel based on the target reference signal; and
    determining, by the UE based on the pathloss, a power for transmitting from the UE to the base station using the beam of the radio channel, wherein a time for determining the transmitting power is longer than in response to the target reference signal is determined to be known for beam management of the radio channel.

12. The method of claim 1, wherein the characteristics of the beam of the radio channel comprise spatial parameters of the beam, wherein the beam is used to receive the reference signal and the target reference signal from the base station.

13. The method of claim 1, further comprising:
    receiving, by the UE from the base station, configuration information to indicate that the reference signal is QCL with the target reference signal and to configure the UE to report the RSRP measurement based on the received signal power of the reference signal.

14. The method of claim 1, wherein the target reference signal comprises a synchronization signal block (SSB) or a channel state information reference signal (CSI-RS) used by the UE for characterizing the beam of the radio channel.

15. A baseband processor of a wireless user equipment (UE) configured to perform operations comprising:
   receive from a base station of a communication network a reference signal of a radio channel between the UE and the base station, wherein the reference signal is quasi co-located (QCL) with a target reference signal of the radio channel;
   determine a received signal power of the reference signal;
   transmit to the base station a reference signal receiver power (RSRP) measurement based on the received signal power of the reference signal;
   receive from the base station a command to activate the target reference signal;
   determine whether the target reference signal is known for beam management of the radio channel based on a timing of when the reference signal is received, the RSRP measurement is transmitted, and the command is received; and
   determine characteristics of a beam of the radio channel in response to the target reference signal is determined to be known to switch to the beam within a maximum delay after the command is received.

16. The baseband processor of claim 15, wherein the reference signal is configured to be QCL with the target reference signal in a Type-D relationship, wherein the reference signal and the target reference signal share spatial receive parameters of the radio channel.

17. The baseband processor of claim 15, wherein the operations to determine whether the target reference signal is known for beam management of the radio channel comprises operations to:
   determine that the reference signal that is QCL with the target reference signal was received within a maximum time interval prior to when the command is received;
   determine that the RSRP measurement was transmitted within the maximum time interval prior to when the command is received; and
   determine that the target reference signal is known for beam management of the radio channel.

18. The baseband processor of claim 15, wherein the reference signal comprises a synchronization signal block (SSB) or a channel state information reference signal (CSI-RS) used by the UE to characterize beams of the radio channel from the base station to the UE.

19. The baseband processor of claim 15, wherein the operations to determine whether the target reference signal is known for beam management of the radio channel comprises operations to:
   determine that the reference signal that is QCL with the target reference signal fails to be received within a maximum time interval prior to when the command is received; and
   determine that the target reference signal is unknown for beam management of the radio channel.

20. A user equipment (UE) comprising:
   at least one antenna;
   at least one radio, wherein the at least one radio is configured to communicate with a base station of communication network using the at least one antenna; and
   at least one processor coupled to the at least one radio, wherein the at least one processor is configured to perform operations comprising:
      receive from the base station a reference signal of a radio channel between the UE and the base station, wherein the reference signal is quasi co-located (QCL) with a target reference signal of the radio channel;
      determine a received signal power of the reference signal;
      transmit to the base station a reference signal receiver power (RSRP) measurement based on the received signal power of the reference signal;
      receive from the base station a command to activate the target reference signal;
      determine whether the target reference signal is known for beam management of the radio channel based on a timing of when the reference signal is received, the RSRP measurement is transmitted, and the command is received; and
      determine characteristics of a beam of the radio channel in response to the target reference signal is determined to be known to switch to the beam within a maximum delay after the command is received.

* * * * *